(12) United States Patent
Hassan et al.

(10) Patent No.: US 9,094,834 B2
(45) Date of Patent: Jul. 28, 2015

(54) WHITE SPACE UTILIZATION

(75) Inventors: Amer A. Hassan, Kirkland, WA (US);
Daniel A. Reed, Redmond, WA (US);
Paul W. Garnett, Albany, NY (US);
Billy Anders, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 13/609,271

(22) Filed: Sep. 11, 2012

(65) Prior Publication Data
US 2014/0073261 A1    Mar. 13, 2014

(51) Int. Cl.
*H04B 17/00*    (2006.01)
*H04W 16/14*    (2009.01)
*H04W 24/00*    (2009.01)

(52) U.S. Cl.
CPC .............. *H04W 16/14* (2013.01); *H04W 24/00* (2013.01)

(58) Field of Classification Search
CPC .... H04W 24/00; H04W 48/14; H04W 52/243
USPC ............ 455/67.11, 501, 63.1, 503, 3.01, 130, 455/133, 134, 161.3, 226.1, 226.2
See application file for complete search history.

(56) References Cited

U.S. PATENT DOCUMENTS

| | | |
|---|---|---|
| 7,013,158 B1 | 3/2006 | Cook |
| 7,876,786 B2 | 1/2011 | Bahl et al. |
| 8,185,120 B2 | 5/2012 | Hassan et al. |
| 8,467,359 B2 | 6/2013 | McCann et al. |
| 8,483,155 B1 | 7/2013 | Banerjea et al. |
| 8,588,158 B2 | 11/2013 | Kim et al. |
| 8,605,741 B2 | 12/2013 | Kim et al. |
| 8,767,763 B2 | 7/2014 | Kim et al. |
| 2001/0048746 A1 | 12/2001 | Dooley |
| 2004/0248585 A1 | 12/2004 | Karacaoglu |
| 2004/0259546 A1 | 12/2004 | Balachandran et al. |
| 2007/0275730 A1 | 11/2007 | Bienas et al. |
| 2008/0113787 A1 | 5/2008 | Alderucci et al. |
| 2008/0130519 A1 | 6/2008 | Bahl et al. |
| 2009/0061892 A1 | 3/2009 | Lee et al. |

(Continued)

FOREIGN PATENT DOCUMENTS

| | | |
|---|---|---|
| EP | 1740001 A1 | 1/2007 |
| EP | 2224771 A1 | 9/2010 |

(Continued)

OTHER PUBLICATIONS

Fazeli-Dehkordy, et al., "Wide-Band Collaborative Spectrum Search Strategy for Cognitive Radio Networks", Retrieved at <<http://ieeexplore.ieee.org/stamp/stamp.jsp?arnumber=05765552>>, Proceedings of IEEE Transactions on Signal Processing, vol. 59, No. 8, Aug. 2011, pp. 3903-3914.

(Continued)

*Primary Examiner* — Tuan Pham
(74) *Attorney, Agent, or Firm* — Dan Choi; Judy Yee; Micky Minhas (57) ABSTRACT

The concepts relate to radio white space utilization. One example can measure a potential radio white space frequency. The example can also communicate results of the measuring for other devices and receive other results from the other devices relating to the potential radio white space frequency. The method can further determine whether the potential radio white space frequency is actually an available radio white space frequency based upon the results and the other results.

20 Claims, 8 Drawing Sheets

(56) References Cited

U.S. PATENT DOCUMENTS

| | | | |
|---|---|---|---|
| 2009/0144791 A1* | 6/2009 | Huffman et al. | 725/114 |
| 2009/0196180 A1 | 8/2009 | Bahl et al. | |
| 2009/0247201 A1 | 10/2009 | Ye et al. | |
| 2010/0048234 A1 | 2/2010 | Singh | |
| 2010/0309806 A1 | 12/2010 | Wu et al. | |
| 2011/0076959 A1 | 3/2011 | Selen et al. | |
| 2011/0080882 A1 | 4/2011 | Shu et al. | |
| 2011/0090887 A1 | 4/2011 | Kim et al. | |
| 2011/0096770 A1 | 4/2011 | Henry | |
| 2011/0164186 A1 | 7/2011 | Sadek et al. | |
| 2011/0164580 A1 | 7/2011 | Keon | |
| 2011/0182257 A1 | 7/2011 | Raveendran et al. | |
| 2011/0223877 A1 | 9/2011 | Tillman et al. | |
| 2011/0228666 A1 | 9/2011 | Barbieri et al. | |
| 2011/0237238 A1 | 9/2011 | Hassan et al. | |
| 2011/0264780 A1 | 10/2011 | Reunamki et al. | |
| 2011/0287802 A1 | 11/2011 | Ma et al. | |
| 2011/0299509 A1 | 12/2011 | Wang et al. | |
| 2011/0306375 A1 | 12/2011 | Chandra et al. | |
| 2011/0307612 A1 | 12/2011 | Junell et al. | |
| 2011/0310865 A1 | 12/2011 | Kennedy et al. | |
| 2011/0319129 A1* | 12/2011 | Bhat et al. | 455/552.1 |
| 2012/0052891 A1 | 3/2012 | Irnich et al. | |
| 2012/0094681 A1 | 4/2012 | Freda et al. | |
| 2012/0120892 A1 | 5/2012 | Freda et al. | |
| 2012/0148068 A1 | 6/2012 | Chandra et al. | |
| 2012/0182883 A1 | 7/2012 | Junell et al. | |
| 2012/0230250 A1 | 9/2012 | Kasslin et al. | |
| 2012/0238304 A1 | 9/2012 | Lambert et al. | |
| 2012/0281594 A1 | 11/2012 | Stewart et al. | |
| 2012/0300761 A1 | 11/2012 | Vasko et al. | |
| 2012/0307685 A1 | 12/2012 | Kim et al. | |
| 2013/0070605 A1 | 3/2013 | Ghosh et al. | |
| 2013/0195096 A1 | 8/2013 | Kim et al. | |
| 2013/0223357 A1 | 8/2013 | Jones et al. | |
| 2014/0066059 A1* | 3/2014 | Patil et al. | 455/434 |

FOREIGN PATENT DOCUMENTS

| | | |
|---|---|---|
| GB | 2477916 A | 8/2011 |
| GB | 2492967 A | 1/2013 |
| WO | 2006/117587 A1 | 11/2006 |
| WO | 2010/022156 A2 | 2/2010 |
| WO | 2010/108439 A1 | 9/2010 |
| WO | 2011/062722 A1 | 5/2011 |
| WO | 2011053078 A2 | 5/2011 |
| WO | 2012035190 A1 | 3/2012 |
| WO | 2012087694 A1 | 6/2012 |
| WO | 2012125631 A1 | 9/2012 |
| WO | 2012171456 A2 | 12/2012 |
| WO | 2012174152 A2 | 12/2012 |

OTHER PUBLICATIONS

Wang, et al., "Channel Assignment of Cooperative Spectrum Sensing in Multi-Channel Cognitive Radio Networks", Retrieved at <<http://ieeexplore.ieee.org/stamp/stamp.jsp?arnumber=05962509>>,Proceedings of IEEE International Conference on Communications (ICC), Jun. 5, 2011, pp. 1-5.

"Outdoor heterogeneous ISM/TVWS VSN testbed", Retrieved at <<http://www.crew-project.eu/vsn>>,Retrieved Date: Feb. 21, 2012, pp. 3.

Min, et al., "Detection of Small-Scale Primary Users in Cognitive Radio Networks", Retrieved at <<http://ieeexplore.ieee.org/stamp/stamp.jsp?tp=&arnumber=5701689>>, Proceedings of IEEE Journal on Selected Areas in Communications, vol. 29, Issue 2, Feb. 2011, pp. 13.

Kokkinene, Heikki, "Propagating Thoughts", Retrieved at <<http://www.fairspectrum.com/propagating-thoughts>>, May 20, 2012, pp. 7.

Fatemieh, et al., "Using Classification to Protect the Integrity of Spectrum Measurements in White Space Networks", Retrieved at <<http://www.cs.illinois.edu/~moinzad1/omid/pubs/FatemiehFCG11.pdf>>,In the Proceedings of the 18th Annual Network and Distributed System Security Symposium, Feb. 2011, pp. 17.

Gurney, et al., "Geo-location Database Techniques for Incumbent Protection in the TV White Space", Retrieved at <<http://ieeexplore.ieee.org/stamp/stamp.jsp?tp=&arnumber=4658242>>, Proceedings of 3rd IEEE Symposium on New Frontiers in Dynamic Spectrum Access Networks, Oct. 14, 2008, pp. 9.

Shellhammer, et al., "Technical Challenges for Cognitive Radio in the TV White Space Spectrum", Retrieved at <<http://ita.ucsd.edu/workshop/09/files/paper/paper_1500.pdf>>, Information Theory and Applications Workshop, 2009, Feb. 8, 2009, pp. 323-333.

Viola, Catherine, "TV white spaces: a new option for smart grid communications?", Retrieved at <<http://www.smartgridopinions.com/article/tv-white-spaces-new-option-smart-grid-communications>>, Sep. 27, 2011, pp. 9-27.

"International Search Report & Written Opinion for PCT Patent Application No. PCT/US2013/058348", Mailed Date: Nov. 18, 2013, Filed Date: Sep. 6, 2013, 11 Pages.

Na, et al., "Policy-Based Dynamic Channel Selection Architecture for Cognitive Radio Networks", In Proceedings of Second International Conference on Communications and Networking in China, Aug. 22, 2007, 5 Pages.

"International Preliminary Report on Patentability," from PCT Patent Application No. PCT/US2014/020949, Mailed Date: Feb. 10, 2015, 7 pages.

"PCT Demand and Response to International Search Report & Written Opinion," Filed Oct. 6, 2014, 15 pages.

U.S. Appl. No. 13/564,727; Non-Final Office Action Mailed Jan. 6, 2015, 22 pages.

U.S. Appl. No. 13/773,660; Final Office Action Mailed Jan. 27, 2015, 15 pages.

Achtzehn et al., "Deployment of a Cellular Network in the TVWS: A Case Study in a Challenging Environment," Retrieved at <<aachen.de/fileadmin/templates/images/PublicationPdfs/2011/CoRoNet2011-Cellular-in-TV-White-Spaces.pdf>>, In 3rd ACM workshop on Cognitive radio networks, Sep. 19, 2011, pp. 6.

Marcus, et al., "Regulatory and Policy Issues—Unlicensed Cognitive Sharing of TV Spectrum: The Controversy at the Federal Communications Commission," In IEEE Communications Magazine, vol. 43 Issue 5, May 2005, pp. 24-25.

International Search Report & Written Opinion, Mailed Date: Oct. 6, 2014, From PCT Patent Application No. PCT/US2014/020949, 15 pages.

International Search Report & Written Opinion, Mailed Date: Sep. 8, 2014 From PCT Patent Application No. PCT/US2014/016747, 15 pages.

Saeed, et al., "TVBDs Coexistence by Leverage Sensing and Geolocation Database," Retrieved at <<http://ieeexplore.ieee.org/stamp/stamp.jsp?tp=&arnumber=6271147>>, International Conference on Computer and Communication Engineering, Jul. 3, 2012, 7 Pages.

"Response to Non-Final Office Action," Filed Date:Dec. 15, 2014, From U.S. Appl. No. 13/828,622, 12 pages.

"PCT Demand for International Preliminary Examination," Mailed Date: Dec. 22, 2014, From US PCT Application No. PCT/US2014/016747, 14 pages.

"Demand under Article 31," From PCT Patent Application No. PCT/2014/020949, Mailed Date: Jun. 6, 2014, 15 pages.

"Final Office Action," Mailed Date: Dec. 9, 2014, From U.S. Appl. No. 13/525,370, 15 pages.

"Response to Non-Final Office Action," Filed Date: Oct. 27, 2014, From U.S. Appl. No. 13/525,370, 12 pages.

"Non-Final Office Action," Mailed Date: Jun. 27, 2014, From U.S. Appl. No. 13/525,370, 13 pages.

U.S. Appl. No. 13/773,660, filed Feb. 22, 2013 by Hassan et al., 16 pages.

U.S. Appl. No. 13/828,820, filed Mar. 14, 2013 by Mitchell et al., 23 pages.

U.S. Appl. No. 13/828,622, filed Mar. 14, 2013 by Hassan, et al., 23 pages.

U.S. Appl. No. 13/525,370, filed Jun. 14, 2012 by Hassan et al., 12 pages.

(56) References Cited

OTHER PUBLICATIONS

U.S. Appl. No. 13/564,727, filed Aug. 2, 2012 by Hassan, et al., 20 pages.
Achtzehn, et al., "Deployment of a Cellular Network in the TVWS: A Case Study in a Challenging Environment", Retrieved at <<aachen.de/fileadmin/templates/images/PublicationPdfs/2011/CoRoNet2011-Cellular-in-TV-White-Spaces.pdf>>, In 3rd ACM workshop on Cognitive radio networks, Sep. 19, 2011, pp. 6.
Bogucka, et al., "Secondary spectrum trading in TV white spaces", Retrieved at <<http://ieeexplore.ieee.org/stamp/stamp.jsp?tp=&arnumber=6353691>>IEEE Communications Magazine, vol. 50, Issue. 11, Nov. 2012, pp. 9.
Inter Digital, "Dynamic Spectrum Management,", White Paper, Oct. 12, 2012.
Feng, et al., "Database-Assisted Multi-AP Network on TV White Spaces: Architecture, Spectrum, Allocation and AP Discovery", Retrieved at <<http;??ieeexplore.ieee.org/stamp/stamp.jsp?tp=&arnumber=5936215>>, Symposium on New Frontiers in Dynamic Spectrum Access Networks, May 3, 2011, pp. 12.
Ghosh et al., "Coexistence Challenges for Heterogeneous Cognitive Wireless Networks in TV White Spaces," IEEE Wireless Communications, vol. 18, Issue 4, Aug. 25, 2011, pp. 22-31.
"International Search Report & Written Opinion" from PCT Application No. PCT/US2014/020949, Mailed Date: Jun. 6, 2014, Filed Date: Mar. 6, 2014, 11 pages.
"International Search Report & Written Opinion for PCT Application No. PCT/US2014/020951", Mailed Date: Jun. 10, 2014, Filed Date: Mar. 6, 2014, 12 Pages.
"International Search Report & Written Opinion for PCT Application No. PCT/US2013/0452841", Mailed Date: Sep. 18, 2013, Filed Date: Jun. 12, 2013, 14 Pages.
Kertulla et al., "Dimensioning of Secondary Cellular in TVWS," Proceedings of the Seventh International Conference on Cognitive Radio Oriented Wireless Networks and Communications, Jun. 18-20, 2012, pp. 190-195.
Sato et al., "TV White Spaces as Part of the Future Spectrum Landscape for Wireless Communications," ETSI Workshop on Reconfigurable Radio Systems, Dec. 12, 2012.
Simic et al., "Wi-Fi, but Not on Steroids: Performance Analysis of a Wi-Fi-Like Network Operating in TVWS under Realistic Conditions," Proceedings of the IEEE International Conference on Communications, 2012, pp. 1533-1538.
TV White Spaces: A Global Momentum towards Commercialization:, Retrieved at <<http://whitespace.i2r.a-star.edu.sg/TVWS_Workshop/Slides/8%209%2010_Inside%20the%20nerve%20Centre%20-%20COMPLETE%20SESSION.pdf>>, Oct. 10, 2012, pp. 22.
"Non-Final Office Action", From U.S. Appl. No. 13/773,660, filed Feb. 22, 2013, Mailed: Jun. 9, 2014.
"Response to the Jun. 9, 2014 Non-Final Office Action", From U.S. Appl. No. 13/773,660, Mailed: Oct. 30, 2014.
"Non-Final Office Action", From U.S. Appl. No. 13/828,622, filed Mar. 14, 2013, Mailed: Aug. 15, 2014.
"Written Opinion of the International Preliminary Examining Authority," from PCT Patent Application No. PCT/US2014/016747, Mailed Date: Mar. 3, 2015, 8 pages.
"Written Opinion of the International Preliminary Examining Authority," from PCT Patent Application No. PCT/US2014/020951, Mailed Date: Feb. 16, 2015, 5 pages.
Seok, Yongho, (LG Electronics), "CC4 Comment-Resolution-Reduced Neighbor Report; 11-13-0024-02-00af-cc4-comment-resolution-reduced-neighbor report," IEEE SA Mentor; 11-13-0024-02-00AF-CC4-COMMENT-RESOLUTION-REDUCED-NEIGHBOR-REPORT, IEEE-SA Mentor, Piscataway, NJ, USA, vol. 802.11af, No. 2, Jan. 14, 2013, pp. 1-5, XP068040396, [retrieved on Jan. 14, 2013].
"Non-Final Office Action," from U.S. Appl. No. 13/828,820, Mailed Mar. 3, 2015, 19 pages.
Response Filed Apr. 28, 2015 to the Final Office Action Mailed Jan. 27, 2015 for U.S. Appl. No. 13/773,660 Filed Feb. 22, 2013 by Amer A. Hassan, 11 pages.
Response Filed Jun. 4, 2015 to the Non-Final Office Action Mailed Jan. 6, 2015 for U.S. Appl. No. 13/564,727 by Amer A. Hassan, 10 pages.
Notice of Allowance Mailed May 4, 2015 for U.S. Appl. No. 13/525,370 by Amer A. Hassan, 8 pages.

\* cited by examiner

WHITE SPACE UTILIZATION

BACKGROUND

Ever increasing numbers of wireless devices are being introduced and sold. As such, the radio frequency (RF) spectrum available for these wireless devices to communicate continues to get more and more crowded. More efficient use of the RF spectrum, and sharing underutilized RF spectrum are very important to meet the growing number of wireless devices. One portion of the RF spectrum that is underutilized is the portion reserved for broadcasting television and/or radio. Governmental regulators divided the TV portion (and/or other portions) into a plurality of channels or frequencies. However, for any given geographic region many of the frequencies are not utilized for TV or radio broadcasting.

Unused frequencies of the reserved portion of the RF spectrum can be referred to as white space. It is possible to utilize these white spaces for other uses; however, their use tends to be tightly regulated by governmental institutions (such as the Federal Communications Commission in the United States).

Techniques have been attempted where a device that wants to utilize a white space frequency senses whether the white space frequency is being utilized. The device can utilize the white space frequency if the sensing indicates the white space frequency is not being utilized for other purposes. These techniques produced too many scenarios where the device's sensing missed detecting the use and its own RF transmission then created interference. When more stringent criteria are applied to avoid such situations, the devices tend to produce so many false positives that again the system is unworkable (e.g., white spaces are identified as being unavailable).

As such, the above-mentioned governmental institutions decided to establish regulatory databases that map channel or frequency utilization to geographic location. Stated another way, for a given geographic location, the database indicates a sub-set of frequencies or channels that are utilized for broadcasting and other licensed use (such as wireless microphones in some countries) and/or a different sub-set of frequencies that are white spaces. Potentially, the governmental institutions may allow individual white space frequencies to be temporarily used for other purposes. However, any access point device (sometimes referred to as a "master") that wants to temporarily use one or more of these white space frequencies has to have the capability to know its own geographic location to within an accuracy acceptable by the regulators and also has to have access to the database via the Internet so that the device's location can be utilized in conjunction with the locations in the database. The device may be able to obtain authorization to utilize individual white space frequencies according to specific conditions or constraints. For instance, the constraints may relate to the location of the device, a duration of the authorization, and/or an allowed transmission power. Other available radio frequencies may be handled in a similar manner. The regulatory database system imposes a high overhead on devices trying to use white spaces (e.g., the ability to access the database and the ability to self-determine geographic location). Further, the regulatory databases tend to be set up very conservatively to avoid interfering uses and, as such, available white spaces remain unused.

SUMMARY

The described implementations relate to radio white spaces utilization. As used herein, the term "radio white space" can include TV white space frequency and/or any other radio white space frequency. One example can measure a potential radio white space frequency. The example can also communicate results of the measuring for other devices and receive other results from the other devices relating to the potential radio white space frequency. The method can further determine whether the potential radio white space frequency is actually an available radio white space frequency based upon the results and the other results.

Another example can include memory and a processor configured to execute instructions stored on the memory. This example can also include a communication component configured to cause multiple devices to measure signal strength at a potential white space frequency. The communication component can also be configured to obtain information relating to the signal strength measurements from at least some of the multiple devices.

The above-listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio white space frequencies. The term radio white space frequencies can include TV white space frequencies and/or other radio white space frequencies. As used herein a "TV white space frequency" means a frequency or frequency range that was reserved for TV broadcasting, but which is not actually used for TV broadcasting in a particular geographic region. Similarly, "radio white space frequency" means a frequency or frequency range that was reserved for TV broadcasting, for other radio broadcasting, or two-way radio communications, but which is not actually used in such manner in a particular geographic region.

Devices may want to utilize radio white space frequencies because other available frequencies are crowded and/or the radio white space frequencies may have a higher data transfer rate (e.g., bandwidth) than other frequencies that are available to the devices. As mentioned above, it can be very difficult for a device to accurately determine whether a potential radio white space frequency is available (e.g. is the frequency being used or not). One reason for this inability is that the device's environment can affect the device's ability to accurately detect signals at the frequency. For instance, a physical structure proximate to the device may be blocking the signals from the device. The present concepts can allow multiple devices to sense an individual frequency and to share the results. Each device has its own environment and its own capabilities. Thus, the results can reflect multiple different diverse sensed environments. A decision made regarding availability of the sensed individual frequency based upon the multiple different diverse sensed environments can be much more accurate than a decision based upon input from a single device. In this regard, the multiple devices can be thought of as operating collaboratively to provide valuable sensing results upon which a decision regarding availability of a radio white space frequency can be made.

First System Example

Figure 1:
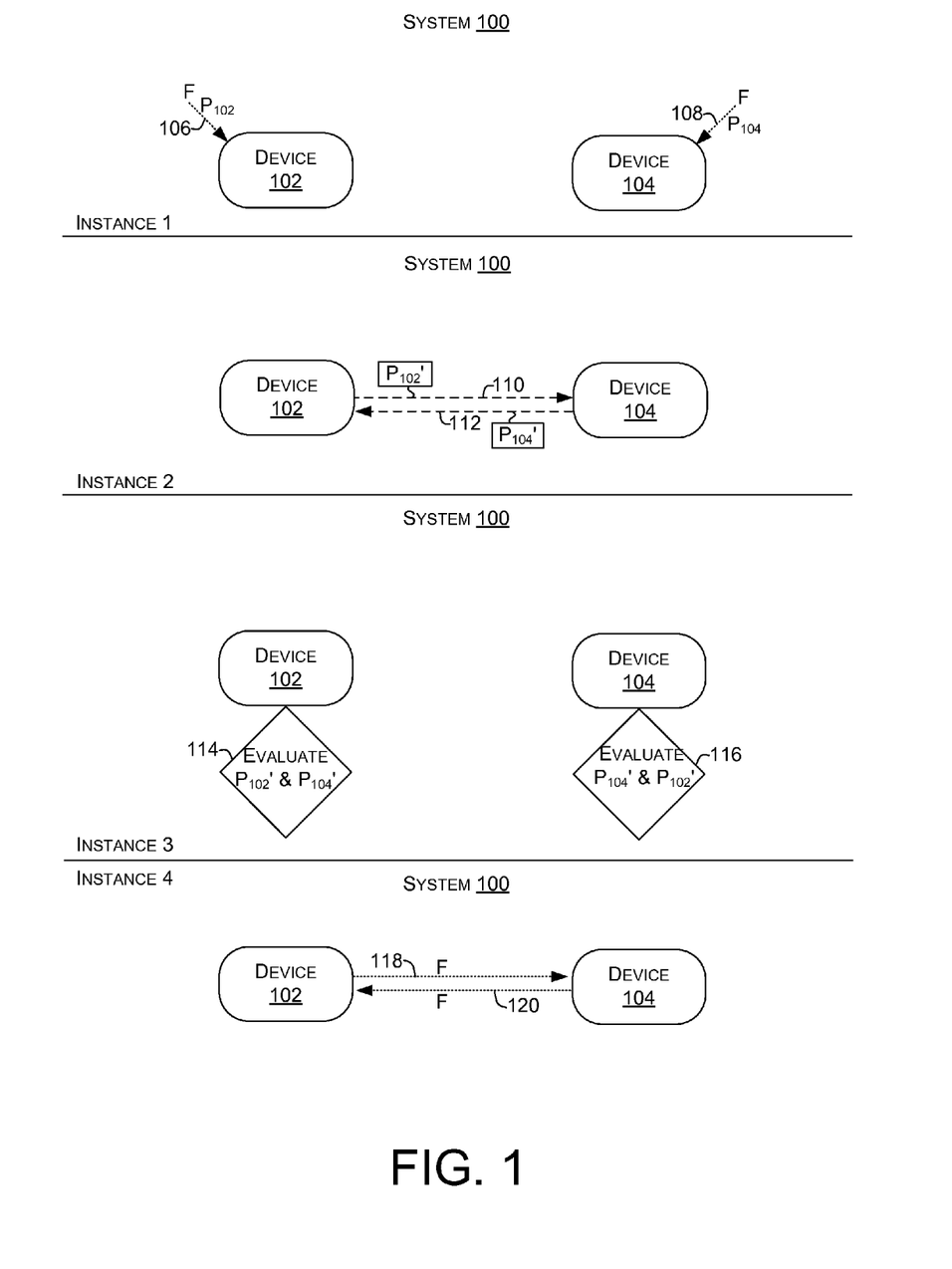
FIGS. 1-6 show examples of systems configured to utilize radio white space frequencies in accordance with some implementations of the present concepts.

For purposes of explanation consider introductory FIG. 1, which shows a system 100 where utilization of radio white space frequencies can be accomplished by devices via collaborative sensing. The collaborative sensing process is explained temporally relative to instances 1, 2, 3, and 4.

In this case, system 100 includes devices 102 and 104. For ease of explanation in this introductory example, assume that devices 102 and 104 have wireless capabilities and that these devices have established a trust relationship and want to communicate over a white space frequency in what can be termed a unicast scenario.

The devices 102 and 104 can initially establish communications over a wireless frequency other than a radio white space frequency. For instance, the devices can establish an internet protocol (IP) connection. Using this wireless frequency, the devices can agree to each measure or sense a potential radio white space frequency F.

At instance 1, device 102 can measure a power $P_{102}$ of frequency F as indicated at 106. Stated another way, device 102 can sense its RF environment at frequency F. Similarly, device 104 can measure a power $P_{104}$ of frequency F as indicated at 108. Note that the environment or perspective of device 102 can be different than the environment or perspective of device 104 and thus the measured powers $P_{102}$ and $P_{104}$ can be different. Note also that the terms 'power' and 'energy' are utilized interchangeably in this document.

Device 102 can process measured power $P_{102}$ to produce results $P_{102}'$. Similarly, device 104 can process measured power $P_{104}$ to produce results $P_{104}'$. Examples of this processing are described in more detail below, but briefly the processing can produce useful information or results (e.g., $P_{102}'$ and $P_{104}'$) about the measured power $P_{102}$ and $P_{104}$ in a more compact fashion (e.g., fewer bits). The processed results can be useful in determining whether or not frequency F is actually an available white space frequency or not.

In instance 2, device 102 can convey or communicate processed results $P_{102}'$ to device 104 as indicated at 110. Similarly, device 104 can convey processed results $P_{104}'$ to device 102 as indicated at 112. This communication can be achieved over the agreed upon wireless frequency.

At instance 3, devices 102 and 104 can each determine whether the potential radio white space frequency F is actually an available radio white space frequency by evaluating processed results $P_{102}'$ and $P_{104}'$. Utilizing the processed results from both devices can provide at least two advantages. First, more measurements are utilized in the determination. In a basic sense, evaluations based upon more measurements tend to be more accurate than those based upon fewer measurements. Second, the processed information from the two devices 102 and 104 is from different perspectives or environments. In a basic sense, evaluations based upon multiple perspectives tend to be more accurate than a similar evaluation based upon information from a single perspective. For instance, a single device may experience interference, such as multipath interference. As such, measuring conducted from a single perspective may show a potential radio white space frequency to be available when in fact it is not. It is much less likely that multiple devices will experience similar interference. This aspect can be thought of as multipath diversity.

At instance 4, in a circumstance where devices 102 and 104 determine that the potential radio white space frequency is in fact available, the devices can utilize the frequency as indicated at 118 and 120.

Figure 4:
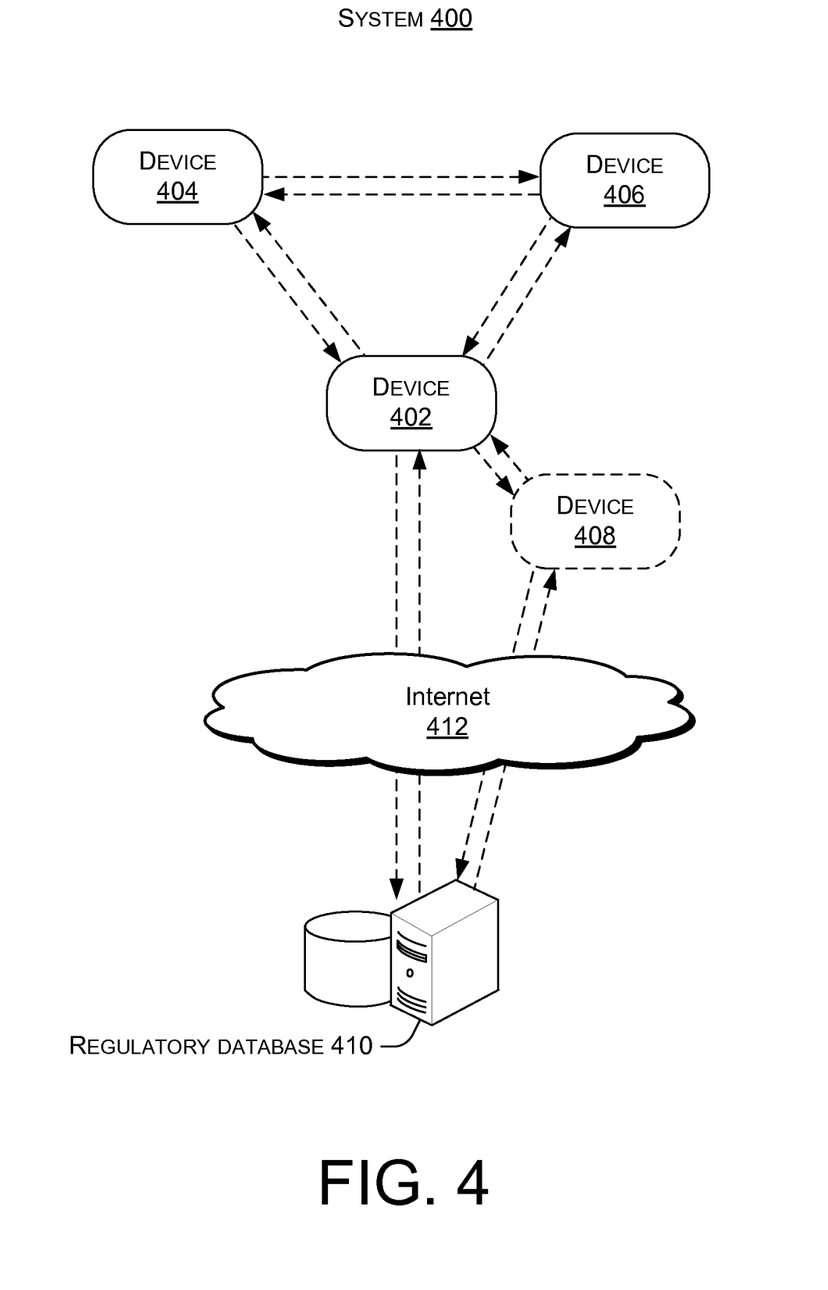
Figure 5:
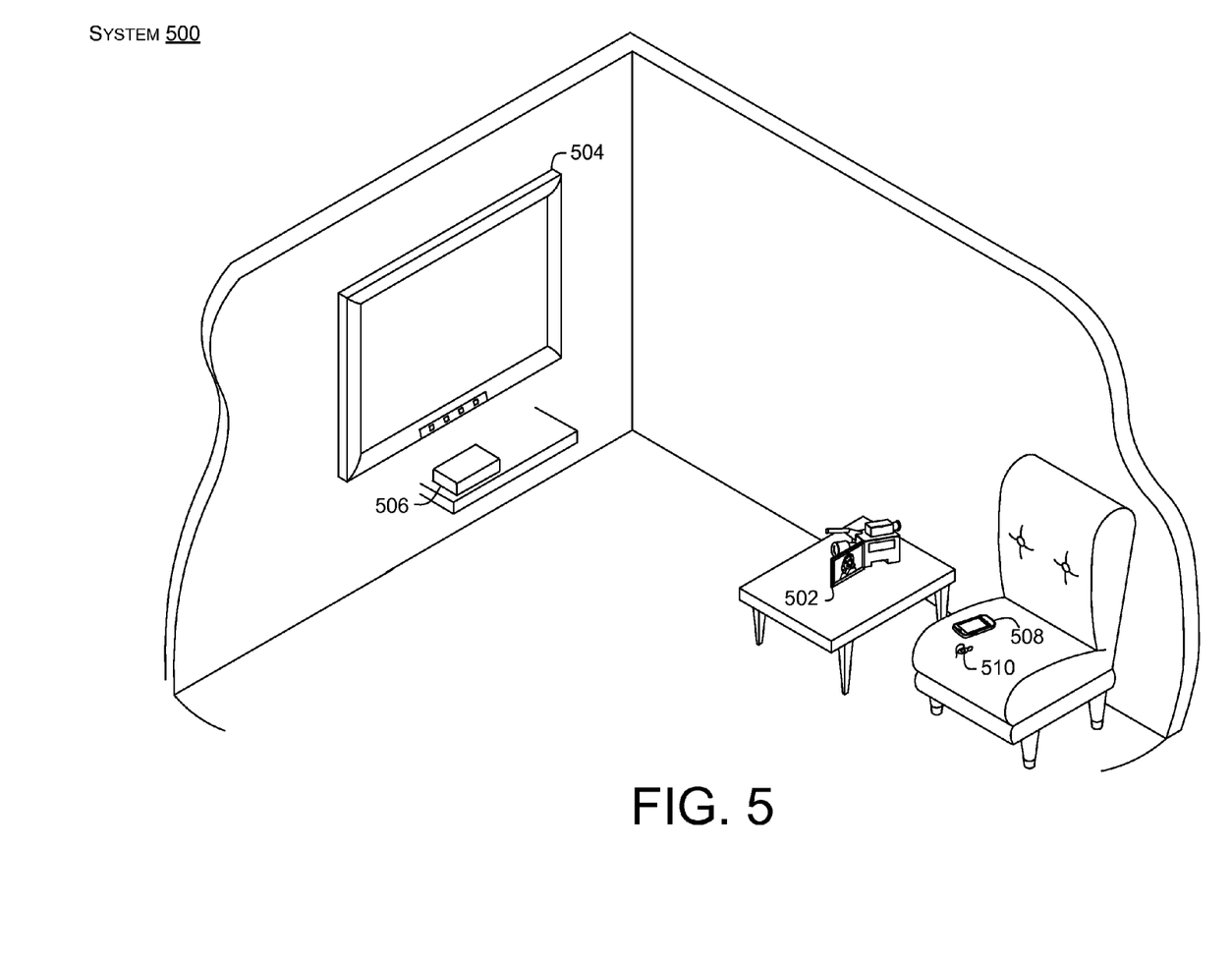

In summary, system 100 relates to a unicast scenario where collaborative sensing leverages multipath diversity to determine the availability of individual radio white space frequencies. FIGS. 4-5 provide examples of collaborative sensing that leverages multipath diversity in multicast and broadcast scenarios, respectively. Before that however, FIGS. 2-3 offer additional details regarding one configuration for employing the present concepts relative to the devices of system 100.

Figure 2:
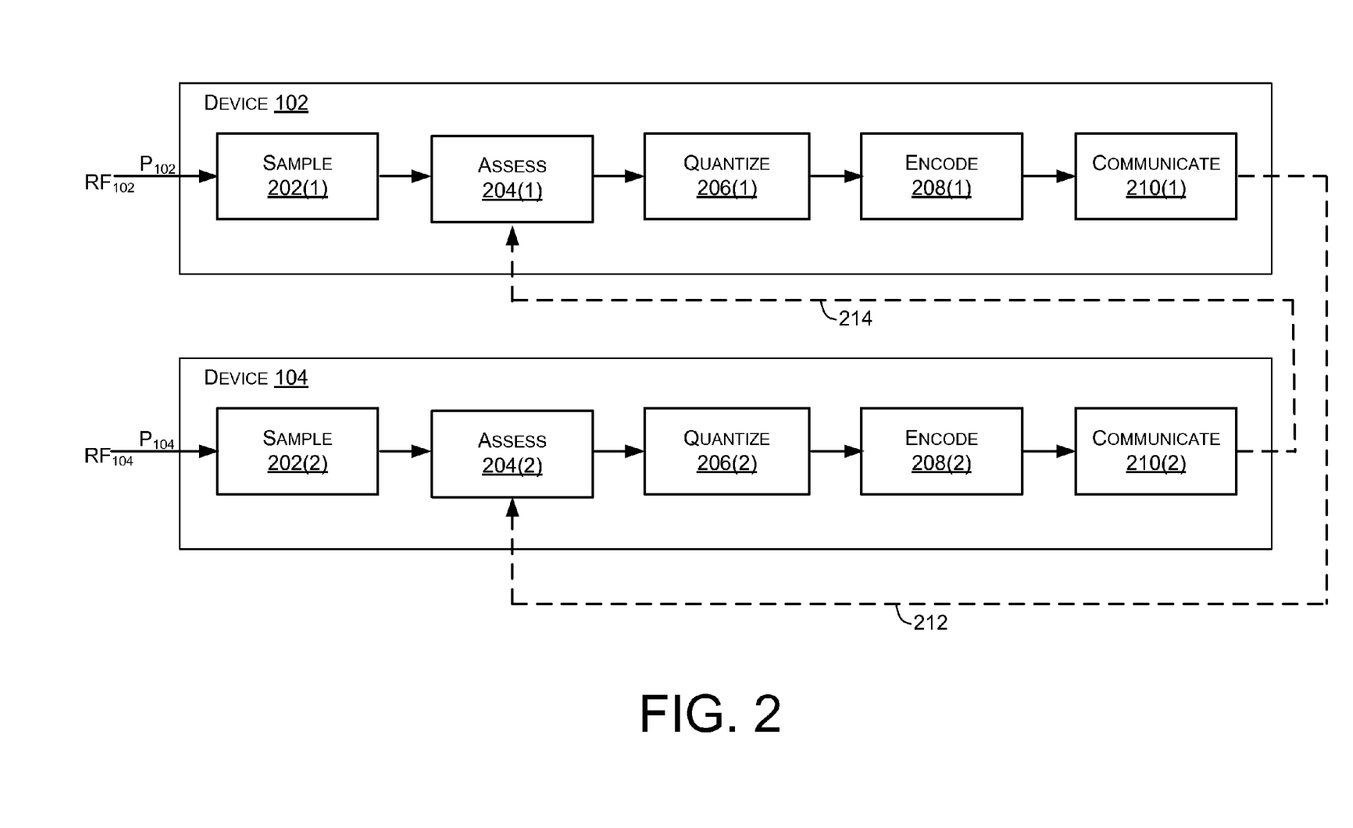

FIG. 2 shows a component diagram of one implementation of devices 102 and 104 relating to collaborative and/or distributive sensing. In this case, each of the devices samples at 202, assesses at 204, quantizes at 206, encodes at 208, and communicates at 210. For ease of explanation, the suffix "(1)" is utilized to indicate an occurrence of these elements on device 102 and the suffix "(2)" is utilized to indicate an occurrence of these elements on device 104. Use of the designators without the suffixes is intended to be generic to an occurrence on one or both of device 102 and device 104.

Sampling 202(1) can measure the local radio frequency environment ($RF_{102}$) of device 102 at specific potential radio white space frequencies. Stated another way, device 102 can measure the power $P_{102}$ at frequency F for its radio frequency environment ($RF_{102}$). Similarly, sampler 202(2) can measure the local radio frequency environment ($RF_{104}$) of device 104 at specific potential radio white space frequencies. Stated another way, device 104 can measure the power $P_{104}$ at frequency F for its radio frequency environment ($RF_{104}$). Various techniques, such as block detection or sequential detection, can be employed for the sampling. (While power is sensed in this example, other examples can alternatively or additionally sample, voltage and/or phase, among other signal properties). The results of the sampled or measured frequency can be supplied as input for assessing at 204.

Assessing 204 can be configured to evaluate the measured potential radio white space frequencies of the respective local radio frequency environments. In this case, the evaluation relates to frequency F and is based upon measured power $P_{102}$ in the case of device 102 and measured power $P_{104}$ in the case of device 104. The evaluation can determine whether an individual potential radio white space frequency is actually an available radio white space frequency based upon the results and the other results. Note that this evaluation can be thought of as a tentative or initial evaluation. Some implementations may not perform this initial evaluation and may instead delay performing the evaluation until additional information is available from other devices (as will be described below). Note also that in some configurations, the assessing 204 can be placed 'after' the quantizing 206. In such a case, the assessor can perform the evaluation on the quantized data (Q) rather than the raw measured data (P). In still another implementation, a likelihood can be calculated that the frequency is available (or unavailable). In such a case, the quantizing can be performed on the likelihood.

In some configurations, the evaluation performed by the assessing 204 can include comparing the measured data from sampling 202 or the quantized data from quantizing 206 to a predefined threshold. The assessing 204 can determine that the individual potential radio white space frequency is available if the data is below the threshold. Conversely, the assessing 204 can determine that the individual potential radio white space frequency is not available (e.g., is being used) if the data is above the threshold. In some of these implementations the assessing 204 can also determine the likelihood associated with determined availability or non-availability. In some cases, the assessing 204 can receive the measured power value(s) from sampling 202 and make an initial decision or evaluation and associated likelihood. The assessing may include forwarding the measured power values, the initial decision, and/or the associated likelihood for quantizing.

Quantizing 206 can process information about the individual potential radio white space frequency. Different information can be quantized in different implementations. For instance, some implementations can quantize the measured data obtained from sampling 202. In other implementations, the quantizing can be performed upon the output of the assessing 204 (e.g., the results). For instance, the quantizing may act upon (quantize) the likelihood provided by the assessing 204 relative to the individual potential white space frequency.

Quantizing 206 can employ various quantization functions or algorithms. For instance, in one case, the quantizing 206 can be implemented as a Q-bit variable quantizer. The selected quantization function can be based at least in part upon resources available to the device 102. For instance, available power and/or processing resources can be considered when performing the quantization. For instance, a battery-operated device may be configured to conserve power usage and as such may select a function that utilizes less power to compute. For instance, such a device may utilize a one-bit or a three-bit quantized output. In contrast a device that has ample power and/or processing resources may be configured with a function that provides more robust output that conveys more information from the sampling. For instance, such a device may output an eight-bit or 16-bit quantized output. Further, a single device may employ different functions in different circumstances. For instance, a smart phone that is plugged in may utilize a different function than when the smart phone is operating on battery power.

This resource based variation can alternatively or additionally be applied to other elements of the devices 102 and 104. For instance, the sampling 202 and/or the quantizing 206 can vary according to whether the device is manifest as a handheld (e.g., battery powered) or plugged-in (e.g., external power). In cases where battery power is not a factor, the sampling rate can be faster to average out thermal noise and can sample more than one channel/frequency at a time in some configurations.

Encoding 208 can receive the results output from the quantizing 206 (e.g., quantized results) and/or the initial evaluation from the assessing 204, if performed. The encoding can perform forward error correction coding on the received output and/or initial evaluation (these two elements can be thought of as availability information). The encoded information can be sent for communicating at 210. Some implementations may eliminate the encoding and simply communicate the initial evaluation and/or the quantized output.

Communicating 210 can function to attempt to convey the availability information from the encoding 208, quantizing 206, and/or assessing 204 to other devices. At this point, the communicating tends to utilize mechanisms other than the potential radio white space frequency since a final determination has not yet been made about the availability of that frequency. The communicating can utilize various other wired or wireless mechanisms to convey the availability information. For example, in the wireless realm the communicating could be accomplished via Wi-Fi, Bluetooth, infrared (IR), 3G, and/or 4G, among other protocols. In one case, the communicating can embed the availability information in a management or control frame of a Wi-Fi or Bluetooth signal. Action frames could also be utilized, but may be less efficient from some perspectives.

In the present example, as mentioned above relative to FIG. 1, assume that the communicating 210(1) of device 102 and the communicating 210(2) of device 104 involved a pre-agreement to send the availability information in an information element of a management frame of a Wi-Fi signal. (Another scenario without such pre-negotiated agreement is described below relative to FIG. 5.)

In this example, the availability information from device 102 can be received by device 104 as indicated by arrow 212. Similarly, availability information from device 104 can be received by device 102 as indicated by arrow 214. At this point, assessing 204(1) can include evaluating results from device 102 and the availability information from device 104 to determine if the individual potential radio white space is in fact available. In a similar fashion, assessing 204(2) can involve evaluating results from sampling 202(2) and the availability information from device 102 to determine if the individual potential radio white space frequency is in fact available. This multisource evaluation (e.g., based upon data from multiple devices each of which senses its own environment) can be more accurate than the initial evaluation described above. One way of expressing this evaluation is evidenced in FIG. 3.

Figure 3:
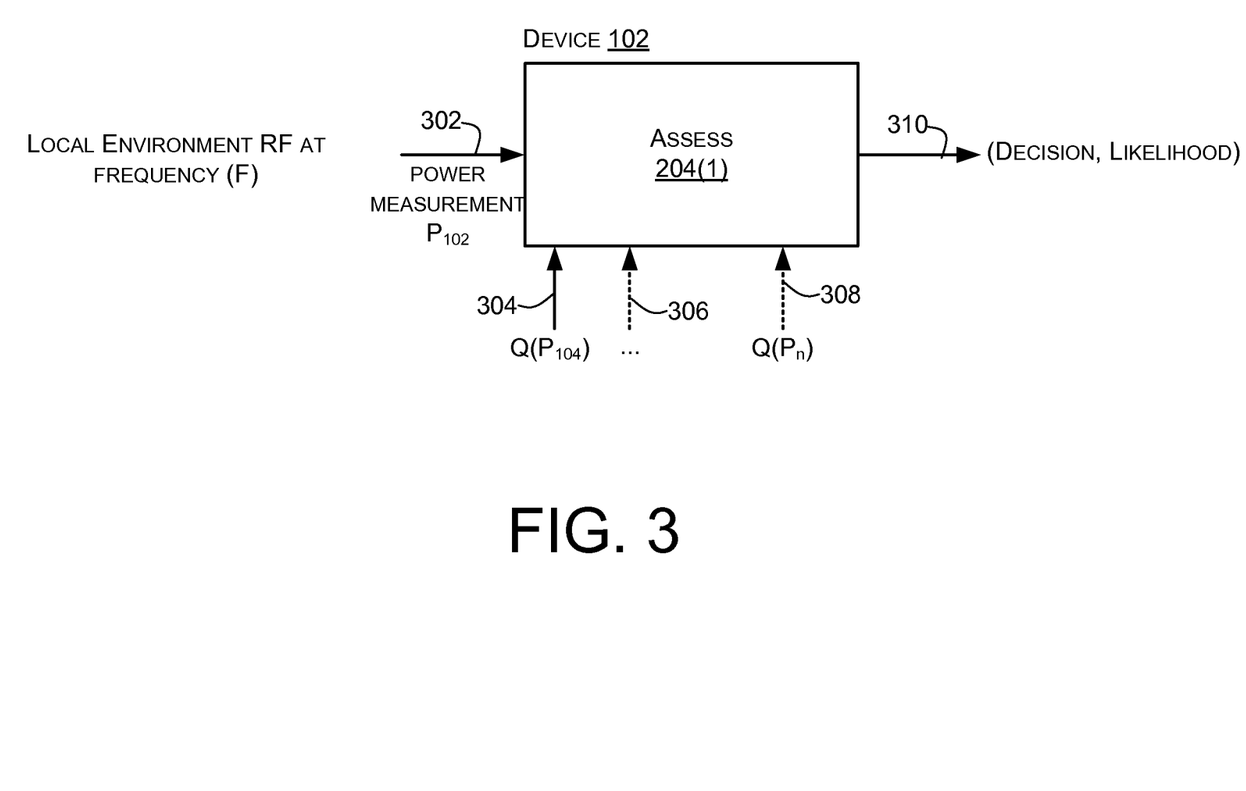

FIG. 3 shows the multisource environment evaluated as part of the assessing 204(1) in the context described relative to FIG. 2. In this case, assessing 204(1) can entail receiving sensed power measurements (or processed results of the sensed power measurements) about the local environment $P_{102}$ for the individual potential radio white space frequency at 302. The assessing 204(1) can also include receiving quantized information about the individual potential radio white space frequency from other environments. In this case, only one other environment is being sensed (by device 104 of FIG. 2). The quantized information $Q(P_{104})$ is received from the other environment at arrow 304. In cases where other devices were involved, their input can be received as indicated by dashed arrows 306 and 308. The assessing 204(1) can utilize the information from the different sensed environments to determine whether the individual potential radio white space frequency (F) is in fact an available radio white space frequency or not as indicated at 310. The device 102 can then utilize the available radio white space frequency. Of course, if the individual potential radio white space frequency is unavailable, the process can be repeated for additional potential radio white space frequencies.

Stated from another perspective, device 102 can obtain local power measurements ($P_{102}$) relative to frequency F as indicated by arrow 302. Explained another way, the device can sense its surroundings by sampling the received signal. The device 102 can then process the received signal $P_{102}$ to determine a likelihood "L" that the frequency F is an available radio white space (S). Thus, the likelihood that the sampled frequency F is an available radio white (S) can be expressed as:

$$L=S/P_{102}$$

This value L can be quantized as $Q(L_{102})$ and sent to device 104. Similarly, device 102 can receive a quantized likelihood $Q(L_{104})$ from device 104. In this case, device 102 can obtain distributed (or collaborative) power measurements from devices in proximity (such as device 104 of FIG. 2) as indicated by arrow 304. These power measurements can be processed by the proximate devices (in this case device 104). For instance, in the illustrated configuration, these power measurements can be quantized values of these (the proximate) devices' power calculations ($P_1, P_2, \ldots, P_m$). The quantizer operation is Q(.). Thus, utilizing the present naming convention the quantized values from device 104 can be characterized as $Q(P_{104})$. Device 102 can then make its decision D regarding the availability of frequency F utilizing its own sensed power $P_{102}$ and the quantized results $Q(P_{104})$ received from device 104. One way of representing the sensed values is conveyed in the matrix provided below.

$$Q_1^{102} \ldots Q_m^{102}$$
$$Q_1^{104} \ldots Q_m^{104}$$
$$Q_1^n \ldots Q_m^n$$

In the matrix the superscript conveys the device which did the sensing or measuring and the subscript represents the quantized values from that (e.g., the sensing) device. For example, the top row of the matrix shows the quantized values from 1 to m sensed by device 102.

As indicated by arrow 310, device 102 can then quantize its power value and communicate this value to the right together with its decision D and likelihood L (e.g., sufficient statistics) that summarizes the data history. Note that this decision can be distinguished from the 'initial decision' mentioned above in that measurements sensed by multiple devices in their respective radio frequency environments can be utilized to arrive at the decision D whereas the initial decision can be based upon measurements from a single device.

Second System Example

FIG. 4 shows another scenario or system 400 that can employ collaborative sensing. System 400 includes four devices 402, 404, 406, and 408. Device 408 is not involved in the first described implementation and as such is shown in ghost (dashed lines). Device 408 is subsequently described relative to a second implementation.

System 400 relates to a mixed collaborative sensing configuration. In this case, the collaborative sensing is similar to the description above relative to FIGS. 1-3 with the addition of database correlation. In this case, for purposes of explanation, assume that device 402 wants to communicate with devices 404 and 406 via a radio white space frequency. Assume that devices 402, 404, and 406 have established a trust relationship over a secondary channel (non white space) using a protocol such as Wi-Fi, Bluetooth, or IR.

Note that the set of potential radio white space frequencies may be quite large. For instance, the set could include more than one-hundred frequencies. As such, having each of devices 402, 404, and 406 measure each frequency, process the results, transmit the results, receive results from the other devices and make a decision regarding availability for each frequency could be resource intensive. In some cases, the mixed approach can address this potentially excessive resource usage issue.

Briefly, in this case, device 402 can obtain an initial listing from regulatory database 110 that can define which frequencies are allocated for use and/or which are not allocated for use relative to a given geographic location. The initial listing can be significantly smaller than the set of potential radio white space frequencies introduced above. For instance, the set of potential radio white space frequencies might be sixty frequencies while only fifty of those frequencies are unallocated. Device 402 can provide the initial listing of unallocated frequencies (or a sub-set thereof) to the other devices 404 and 406 for collaborative sensing.

In order to obtain the initial listing, device 402 can determine its geographic location, such as by using global positioning system (GPS) technologies. Device 402 can access regulatory web-site or database 410 via the Internet 412. Device 402 can supply its geographic location to the regulatory database 410 and request the initial listing. Alternatively, device 402 could request to use one or more radio white space frequencies. The regulatory database 410 can authorize use of a set of one or more available (unallocated and/or otherwise unused) radio white space frequencies (e.g., a sub-set of the listing) at the geographic location and a set of other constraints on the use. For example, the constraints may include a duration of the authorization and/or a specific transmission energy or power level which any transmissions over the frequency are not to exceed. Device 402 and devices 404 and 406 could then collaboratively sense the initial listing in the former example and the authorized set (or a sub-set thereof) in the latter example to confirm or verify that, in fact, individual authorized frequencies are not being used.

Consider now two implementations where device 402 utilizes device 408 to help access regulatory database 410. In a first scenario, assume that device 402 has access to the Internet 412, but is unable to determine its geographic location. In such a case, device 402 could access another device, in this example device 408, that does have the ability to determine its own geographic location. Device 402 could then use this geographic location to obtain the initial listing from the regulatory database 410.

In another example, device 402 may be able to determine its own geographic location, but may not have the capability to access the Internet 412. In such a case, device 402 could communicate with device 408 which does have access to the Internet. For instance, such communications could utilize many types of protocols, such as Wi-Fi or Bluetooth. Device 402 could then cause device 408 to access the regulatory database 410 over the Internet 412 and cause device 408 to supply device 402's geographic location to the regulatory database to obtain the listing. Of course, there can be other configurations, such as where device 402 cannot access the Internet and cannot determine its geographic location and instead leverages one or more other devices to obtain the listing from the regulatory database.

In an alternative implementation, device 402, device 404, and/or device 406 could collaboratively sense a set of one or more potential radio white space frequencies to determine which frequencies appear to be available. Prior to using any apparently available frequencies, device 402 could access the regulatory database to confirm or verify that the apparently available frequencies appear on the listing of 'non-allocated' frequencies for that geographic location.

Third System Example

FIG. 5 shows another collaborative sensing scenario or system 500. The system includes several representative devices that include a video camera 502, a television (TV) 504, a set-top box 506 associated with the TV, a smart phone 508, and a wireless headset 510. In one implementation all of devices 502-510 have some kind of wireless capabilities (e.g., ability to send and receive data). In another implementation, TV 504 does not have wireless capabilities, but is coupled via a wired connection to the set top box which does have wireless capability. As used herein, the set top box can be manifest as a video game console, a DVD player, and/or a digital video recorder, among others.

Assume for purposes of explanation that video camera 502 wants to send video data to the set top box 506 to be stored for subsequent presentation on TV 504. Assume also that the video camera wants to try to send the video data over an available radio white space frequency. The video camera can sense individual potential radio white space frequencies as described above relative to FIGS. 1-4. In this case, the video camera may not have any pre-negotiated agreements with other devices. Instead, the video camera may in alternating fashion, broadcast its results (e.g., a likelihood statistic of a given frequency being used), and listen for results from other devices. For instance, the video camera can broadcast its results in the management frame of many types of wireless protocols, such as Wi-Fi, Bluetooth, IR, etc. The results can be included in a preparatory information element of a beacon transmitted by the video camera.

Assume for purposes of explanation that the video camera 502 receives responses from each of the TV 504, the set top box 506, the smart phone 508, and the wireless head set 510. This collaborative sensing can allow the video camera 502 (and/or the other devices) to make a decision regarding individual potential radio white space frequencies.

There are two aspects of note in this scenario that are discussed below. First, the video camera 502 may receive results from devices that are not going to be involved in the subsequent communications utilizing the radio white space frequency. Stated another way, the set of devices that contribute to the collaborative sensing may not match the set of devices that actually utilize any discovered available radio white space frequencies. Second, the video camera does not have to assign the same value to results from the various devices. Stated another way, the video camera may treat some results as more reliable than other results. These two aspects are discussed in more detail below.

With regard to the first point above, recall that greater sample numbers (especially those from multiple different devices) tends to increase the accuracy of a decision regarding availability of a radio white space frequency. Toward this end, devices may contribute by sensing in circumstances even when the devices are not directly involved in the use. For instance, by participating in collaborative sensing of potential radio white space frequencies the devices can obtain information about which frequencies might be available for their own subsequent use. For instance, in one version of the present scenario, all of the devices 502-510 can collaboratively sense ten potential radio white space frequencies (e.g., each device senses each of the ten frequencies and share their results). Assume that the collaborative sensing results in potential radio white space frequencies four and seven being identified as available radio white space frequencies and the others being unavailable. Video camera 502 may communicate its decision that frequencies four and seven are available over the wireless protocol. The video camera may also utilize the wireless protocol to communicate its intent to use frequency four, for example, to communicate the video data to set top box 506. The video camera can then begin communicating data to the set top box over available radio white space frequency four.

Smart phone 508 is not initially involved in this communication over the identified available radio white space frequencies. However, subsequently, smart phone 508 may want to project its display on TV 504. In such a scenario, smart phone 508 may save resources by utilizing the previous collaborative sensing. For instance, rather than sensing all ten potential radio white space frequencies again, smart phone 508 may recheck available radio white space frequency seven (either by itself or collaboratively). If this sensing reconfirms that radio white space frequency seven is available, the smart phone can begin using this frequency to communicate its display data to the TV. This technique would likely consume fewer resources (e.g., time, power, and/or processing) than starting from scratch (e.g., sensing all ten potential radio white space frequencies). Thus, smart phone 508 can benefit from participating in collaborative sensing even when it does not expect to immediately benefit.

The second aspect introduced above is that the video camera 502 does not have to assign the same value to results from the various devices. For instance, devices may have differences in the quality of their samplers (FIG. 2) and/or differences in the resources that they can dedicate to analyzing the sampled frequencies. For instance, wireless head set 510 based upon consumer demand needs to be small and lightweight and have a relatively long battery life. As such, design constraints may limit the quality of the sampling employed by the wireless head set 510. Further, the evaluation performed on the sampled data may be limited because of the processing capability of the device and/or because such processing uses scarce power resources. In contrast, TV 504 can receive AC power from the grid and as such power usage is not as critical. Further, as part of its basic functionality, the TV needs to accurately tune to and receive specific frequencies (e.g. broadcast channels and/or cable channels). As such, any signals measured by the TV and utilized for collaborative sensing will by definition be relatively highly accurate. For instance, the TV will likely include a tuner that can accomplish the sampling.

The tuner can be coupled with an error decoder. When the tuner is tuned to a specific channel (frequency) the error decoder can determine whether a satisfactory signal is being received by the tuner. If the received signal is not satisfactory relative to predefined threshold criteria employed by the error decoder, then the error decoder can issue an error message that indicates that no signal that satisfies its threshold was detected in the sample period. This can be interpreted as a decision by the TV that the channel is not being used (e.g., is available). The channel may be re-sampled. If the sampled signal fails the error decoder threshold multiple times, the likelihood of the error decoder's decision regarding availability can be given a high degree of confidence of being correct. Also note that in comparison to the wireless head set 510, the TV has ample power to sense signals, amplify the signals, and/or otherwise process those sampled signals for evaluation. Thus, the TV may assign a relatively high degree of likelihood to its findings regarding sensed frequencies that it shares with the other devices. In contrast, the wireless head set 510 may assign a relatively low confidence to its findings.

Further still, in some implementations, the video camera 502 may weight results from the various devices based upon what it knows about the devices (this weighting can be in addition to, or in place of, any confidence assigned by the devices themselves). For instance, video camera 502 may learn information about the devices from their respective beacons and assign weights based upon the learned information. Further, the video camera may weight the results based upon the bits per sample utilized by the device. For instance, an eight or sixteen bit sample utilized by the TV might be weighted higher than a one or three bit sample utilized by the wireless head set 510. Of course these bit values are provided for purposes of explanation and other bits per sample can be employed.

The above aspects are described in the context of specific examples employing specific devices for purposes of explanation, but are of course applicable to other devices.

Figure 6:
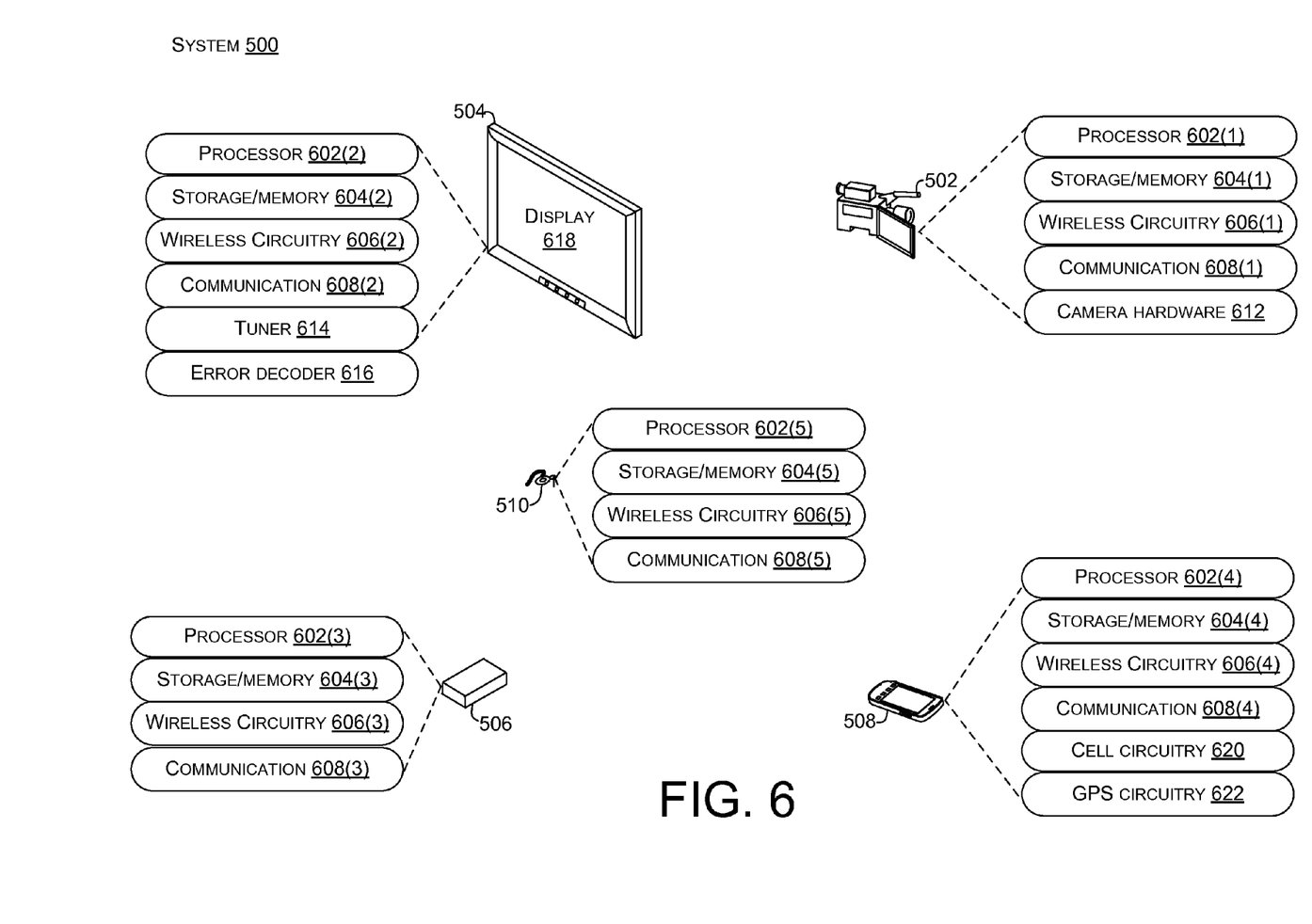

FIG. 6 shows the devices of system 500 and illustrates some of the elements that may be included in such devices. In this case, each device is shown with a processor 602, storage/memory 604, wireless circuitry 606, and a communication component 608. Discussion of these elements relative to a specific device includes the associated suffix. Lack of a suffix indicates a generic discussion of the element. For purposes of explanation, several other elements are discussed relative to specific devices.

In this case, video camera 502 can also include camera hardware 612. TV 504 can also include a tuner 614, an error decoder 616, and a display 618. Smart phone 508 can also include cellular circuitry 620 and GPS circuitry 622. The discussed elements are introduced relative to particular implementations and are not intended to be essential. Of course, individual devices can include alternative or additional components that are not described here for sake of brevity. For instance, devices can include input/output elements, buses, graphics cards, power supplies, optical readers, and/or USB ports, among a myriad of potential configurations.

Wireless circuitry 606 can include a transmitter and/or a receiver that can function cooperatively to transmit and receive data at various frequencies. For example, the wireless circuitry can function to transmit and receive data in the 2.4 Giga Hertz and 5.0 Giga Hertz bands utilized for Wi-Fi in the U.S. (other countries may utilize other frequencies). In another example, the wireless circuitry can operate at various frequencies, such as 2.4 Giga Hertz frequency, 5.0 Giga Hertz frequency, 60 Giga Hertz frequency, radio frequencies, and/or TV channel frequencies (50 Mega Hertz to 810 Mega Hertz), among others. Alternatively, the wireless circuitry can be configured to tune to any frequencies in the RF spectrum.

Note also, that an individual device may not include wireless capabilities but can instead work cooperatively with a device that does. For example, TV 504 could be wired to set top box 506. In such a case, the TV may not have wireless capabilities but can instead work cooperatively with the associated set top box. (In some such cases, the TV may have wireless capability for receiving at specific frequencies (such as from a remote control) but not for transmitting. Note also that the TV and the set top box may operate cooperatively in other ways. For instance, the tuner 614 and the error decoder 616 may be on the set top box such that the TV functions as a monitor or display.

Communication component 608 can control the wireless circuitry 606 to sense various frequencies. Thus, the communication component can cause the wireless circuitry to perform the sampling function described above relative to FIG. 2. The communication component can perform the assessing and quantizing functions and cause the communication component to perform the communicating of FIG. 2.

As introduced above relative to FIG. 4, some of the present implementations can employ mixed collaborative sensing that combines collaborative sensing with location-based radio white space frequency authorization. In the illustrated configuration of FIG. 6, smart phone 508 can accomplish this mixed collaborative sensing. For instance, smart phone 508 can calculate its geographic location utilizing GPS circuitry 622 (or another technique such as cell tower triangulation). The communication component 608(4) can then utilize this location information when accessing a regulatory database (FIG. 4) via cellular circuitry 620. For example, the communication component may cause the smart phone to utilize a uniform resource identifier (URI) of the regulatory database to obtain a location-based mapping of allocated/unallocated radio white space frequencies.

Other devices, such as video camera 502, that do not have the ability to determine their location and/or access the internet can leverage smart phone 508 to obtain the location-based mapping of available/unavailable radio white space frequencies. In one case, the smart phone can function as a wireless access point that interacts with the video camera. In another case, the communication component 608(1) of the video camera can utilize another wireless technology, such as Bluetooth™ to interact with smart phone 508. Once communication is established, the communication component 608(1) can request that the smart phone 508 query the regulatory database (FIG. 4) to obtain the location-based mapping and/or an authorization to use individual available frequencies.

The video camera's communication component 608(1) can obtain the location-based mapping and/or an authorization to use individual available frequencies and accompanying information, such as the location and constraints, from the smart phone 508.

In some instances, the communication component 608(1) can take steps to ensure that any usage of the authorization by the video camera 502 complies with the constraints. For instance, the constraints may include a distance constraint on the authorization.

In some cases, the distance constraint can be conveyed as a power constraint that limits the power or energy of any broadcast to a specific radius from the smart phone's location. For example, the constraint may be a power constraint such that any broadcast from the smart phone's location over an available radio white space frequency is limited to a radius of 1,000 meters, for instance. The communication component 608(1) can take steps to ensure that any use by the video camera conforms to the distance constraint. Stated another way, the communication component 608(1) can consider (or account for) the relative distance between the smart phone 508 and the video camera 502.

In one case, the communication component 608(1) can determine its location relative to the smart phone 508 based upon the success or failure of its communications with the smart phone at a given frequency and power. For instance, at 2.4 Giga Hertz, a 100 milli Watt transmission can generally be received by commercial Wi-Fi or Bluetooth compliant devices up to a range of about 100 meters. Thus, the communication component 608(1) can determine the video camera's relative location to be within 100 meters of the smart phone in an instance where the two devices are successfully communicating at this power and frequency.

Further, knowing its relative location can allow the communication component 608(1) to ensure that any use of the available radio white space frequencies by the video camera complies with the authorization constraints. For example, the communication component can determine a transmission power that does not exceed 500 meters for the available radio white space frequency. Thus, if the video camera is within 100 meters of the smart phone and broadcasts a signal over the available radio white space frequency at a power level that is only detectable for 500 meters, then the maximum transmission distance from the authorized location (e.g., the location of the smart phone) is less than or equal to 600 meters, which falls within the 1000 meter constraint associated with the authorization.

The communication component 608(1) can use various techniques to cause the other devices 504, 506, 508, and/or 510 to sense the frequencies obtained from the regulatory database. For example, the communication component can communicate with other devices about the available radio white space frequencies using 802.11 technologies, Bluetooth technologies, or long term evolution (LTE) technologies, among others. In one such example, the communication component 608(1) can communicate the frequencies to be sensed and/or its own search results using management frames or actions frames of the 802.11 technologies.

In a specific example utilizing the 802.11 technologies, the communication component 608(1) can cause the video camera 502 to operate as a Wi-Fi direct group owner to establish Wi-Fi communication with a different device or devices. The communication component 608(1) can select one or more potential radio white space frequencies for collaborative sensing. By functioning as a Wi-Fi direct group owner, the communication component can identify the potential radio white space frequencies and instruct the different device(s) to sense these frequencies and communicate their results. Once the results are communicated (e.g., shared) individual communication components can decide whether individual frequencies are in fact available radio white space frequencies. As such, in some implementations no 'leader' is needed in that each device is free to decide what actions to take based upon its decision.

In summary, the communication component 608 of an individual device can cause power measurements to be performed on potential radio white space frequencies. As can easily be appreciated from FIG. 5, each device exists in its own RF environment and has its own device configuration (e.g., devices tend to be heterogeneous in their component makeup). Thus, each device can capture a unique perspective relative to the sensed frequency. When used collaboratively, these heterogeneous devices can be thought of as providing multipath diversity relative to the sensed frequency. This multipath diversity can reduce and/or avoid the errors (false positives and/or false negatives) experienced when the sensing is performed by only a single device.

In one implementation, each communication component 608 can analyze the results of its power measurements. The communication component can then make a decision on the availability of individual potential radio white space frequencies (e.g., is an individual frequency being used or is it available). The communication component can then encode a quantized value of the measurement and communicate (e.g., unicast, multicast, or broadcast) to other devices using low power in the 2.4 GHz ISM band or ultralow power radio white space channel (such as allowed by some regulators, thus varying sensing threshold). The communication component can then receive measurements and/or decisions regarding the individual frequency. The communication component can then make a decision regarding the individual frequency based upon the results from multiple devices (each of which senses its own unique RF environment). Thus, multiple devices can be thought of as collaborating in that they each sense a given frequency and collaborate by sharing their results to allow a more accurate decision to be made whether the individual frequency is in fact an available radio white space frequency that can be used or not.

In some cases, the communication component 608 can utilize augmented collaborative sensing. In such configurations, the communication component can utilize a database of location based radio white space availability mapping to verify collaborative sensing of individual potential radio white space frequencies or to reduce a number of frequencies that are collaboratively sensed.

Video camera 502, TV 504, set top box 506, smart phone 508, and wireless headset 510 can be thought of as computers or computing devices as defined to be any type of device that has some amount of processing capability and/or storage capability. Processing capability can be provided by one or more processors that can execute data in the form of computer-readable instructions to provide a functionality. Data, such as computer-readable instructions, can be stored on storage/memory. The storage/memory can be internal and/or external to the computer.

The storage/memory can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media can include "computer-readable storage devices". Examples of computer-readable storage devices include volatile storage media, such as RAM, and non-volatile storage media, such as hard drives, optical discs, and flash memory, among others.

In the illustrated implementation, video camera 502, TV 504, set top box 506, smart phone 508, and wireless headset 510 are configured with general purpose processors and storage/memory. In some configurations, such devices can include a system on a chip (SOC) type design. In such a case, functionalities can be integrated on a single SOC or multiple coupled SOCs. In one such example, the video camera can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include any of the wireless circuitry 606 and/or the communication component 608.

Shared resources can be storage, processing units, etc. that can be used by multiple functionalities. In this example, the shared resources can include the processor and/or storage/memory. In one case, communication component 608 can be implemented as dedicated resources. In other configurations, this component can be implemented on the shared resources and/or the processor can be implemented on the dedicated resources.

In some configurations, the communication component 608 can be installed during manufacture of the computing device or by an intermediary that prepares the computing device for sale to the end user. In other instances, the end user may install the communication component 608, such as in the form of a downloadable application or from a USB thumb drive, among others.

First Method Example

Figure 7:
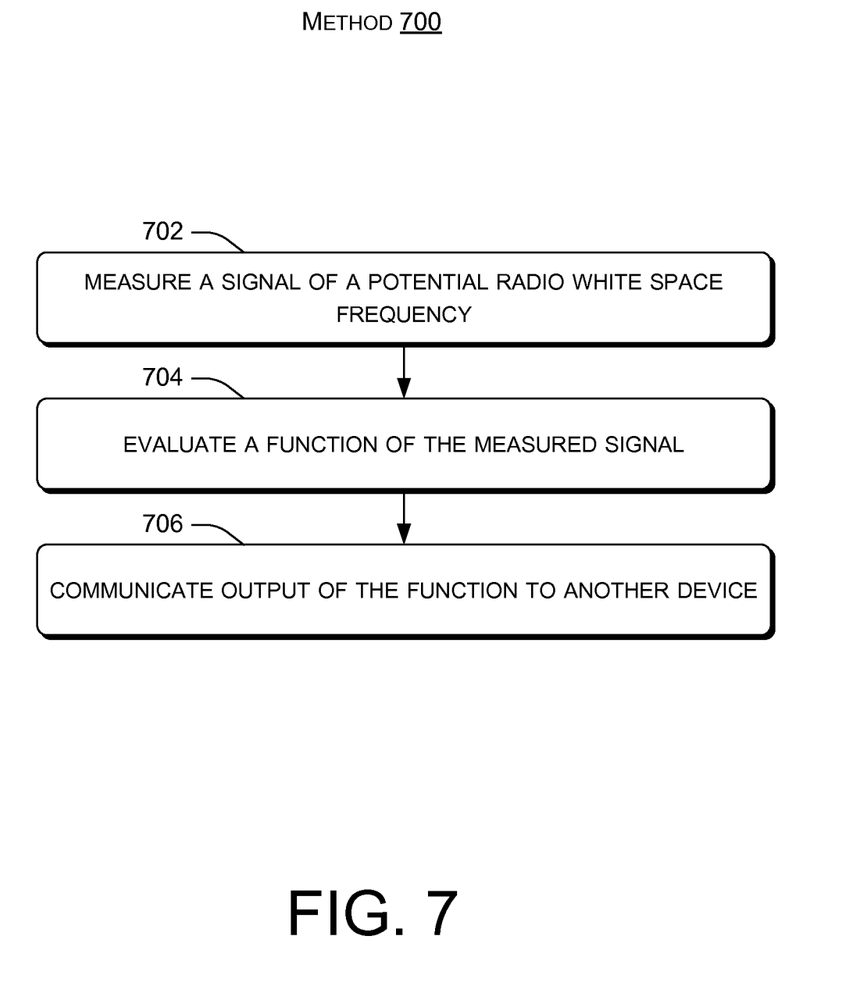
FIGS. 7-8 are flowcharts of examples of radio white space frequency utilization techniques in accordance with some implementations of the present concepts.

FIG. 7 shows a method 700 for utilization of radio white space frequencies.

The method can entail measuring a signal of a potential radio white space frequency at 702. In some cases the measuring can entail measuring a signal property such as strength of the signal (e.g., power), voltage, and/or a phase of the signal.

The method can also entail evaluating a function of the measured signal at 704. In some implementations, the function can be a quantizer mapping a value to a number of bits. In one example the quantizer can be a scalar quantizer. In another example, the quantizer can be a vector optimized quantizer.

In some cases the function output can be selected based upon the device type and/or power status. For example, low power devices can have less complex functions and/or a lower quantizer rate that consume less battery life. In another example, a device can employ a more robust function when plugged in to AC power and a less robust function when relying on battery power.

The method can include communicating output of the function to another device at 706.

Some implementations can also receive other output of the function of the potential radio white space frequency from the another device. For example, the other output can relate to signal measuring performed by the another device at the potential radio white space frequency.

The method can determine whether the potential radio white space frequency is an available radio white space frequency utilizing the output and the other output. In some cases, the determining can involve processing the output from the device and the output from the another device. Such processing can involve assigning relative weights to the different outputs. The method can then decide whether the potential radio white space frequency is an available white space frequency or not based upon the weighted outputs.

Second Method Example

Figure 8:
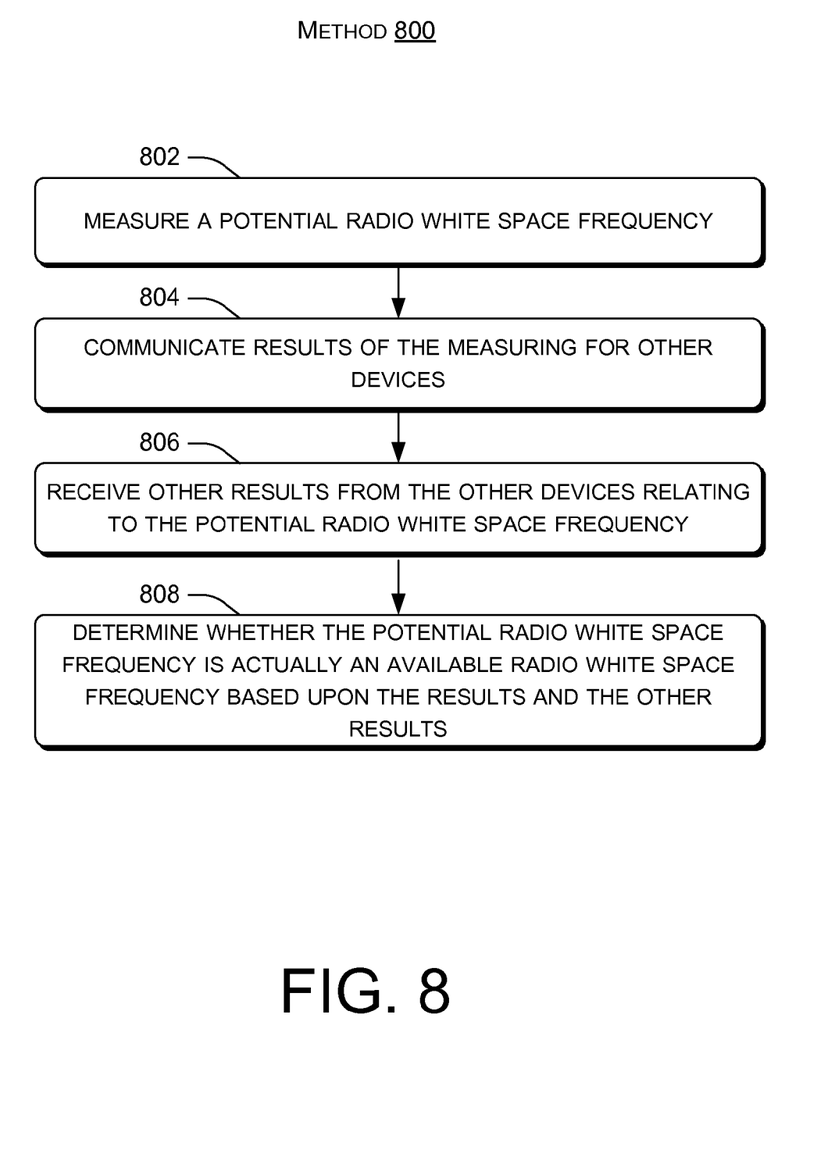

FIG. 8 shows a method 800 for utilization of radio white space frequencies.

The method can include measuring a potential radio white space frequency at 802.

The method can entail communicating results of the measuring for other devices at 804.

The method can include receiving other results from the other devices relating to the potential radio white space frequency at 806.

The method can include determining whether the potential radio white space frequency is actually an available radio white space frequency based upon the results and the other results at 808.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to utilization of radio white space frequencies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
measuring a signal of a potential radio white space frequency;
evaluating a function of the measured signal;
communicating output of the function to another device;
receiving, from the another device, evaluated data regarding the potential radio white space frequency; and
determining whether the potential radio white space frequency is an available radio white space frequency based on the output and the evaluated data.

2. The method of claim 1, wherein the measuring comprises measuring a strength of the signal, a voltage of the signal, or a phase of the signal.

3. The method of claim 1, wherein the communicating comprises unicasting, multicasting, or broadcasting.

4. The method of claim 1, wherein the function quantizes measured input of the potential radio white space frequency to generate the output.

5. The method of claim 1, wherein the evaluated data relates to signal measuring performed by the another device at the potential radio white space frequency.

6. The method of claim 1, further comprising obtaining a geographic location proximate to the measuring and querying a regulatory database for a set of potential radio white space frequencies for the location, and wherein the set of potential radio white space frequencies includes the potential radio white space frequency.

7. A device configured to implement the method of claim 1.

8. A system, comprising:
memory and a processor configured to execute instructions stored on the memory; and,
a communication component configured to:
cause multiple devices to measure signal strength at a potential white space frequency;
obtain information relating to the signal strength measurements from at least some of the multiple devices; and
determine whether the potential white space frequency is an available white space frequency based on the obtained information.

9. The system of claim 8, wherein an individual device comprises a television or wherein an individual device includes a television tuner.

10. The system of claim 9, wherein the information obtained from the television or the television tuner comprises an error message resulting from a signal strength not being satisfactory relative to a predefined threshold criteria.

11. The system of claim 8, wherein the communication component is further configured to weight the information from individual devices.

12. The system of claim 8, wherein the communication component is further configured to determine a likelihood that the signal strength measurements indicate that the potential white space frequency is an available radio white space frequency prior to obtaining the information relating to the signal strength measurements.

13. A computer-readable storage media storing computer-readable instructions that when executed by a processor of a computer cause the computer to perform a method, the method comprising:
measuring a signal of a potential radio white space frequency;
evaluating a function of the measured signal;
communicating output of the function to another device;
receiving, from the another device, evaluated data regarding the potential radio white space frequency; and
determining whether the potential radio white space frequency is an available radio white space frequency based on the output and the evaluated data.

14. The computer-readable storage media of claim 13, wherein the measuring comprises measuring a strength of the signal, a voltage of the signal, or a phase of the signal.

15. The computer-readable storage media of claim 13, wherein the communicating comprises unicasting, multicasting, or broadcasting.

16. The computer-readable storage media of claim 13, wherein the function quantizes measured input of the potential radio white space frequency to generate the output.

17. The computer-readable storage media of claim 13, wherein the evaluated data relates to signal measuring performed by the another device at the potential radio white space frequency.

18. The computer-readable storage media of claim 13, further comprising obtaining a geographic location proximate to the measuring and querying a regulatory database for a set of potential radio white space frequencies for the location, and wherein the set of potential radio white space frequencies includes the potential radio white space frequency.

19. The method of claim 1, wherein evaluating a function of the measured signal further comprises selecting an evaluation function to be used based upon available processing resources.

20. The computer-readable storage media of claim 13, wherein evaluating a function of the measured signal further comprises selecting an evaluation function to be used based upon available processing resources.

\* \* \* \* \*